United States Patent
Didey

(10) Patent No.: US 10,421,535 B2
(45) Date of Patent: Sep. 24, 2019

(54) DRIVE SYSTEM FOR AIRCRAFT LANDING GEAR

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 55 days.

(21) Appl. No.: 15/021,291

(22) PCT Filed: Sep. 8, 2014

(86) PCT No.: PCT/GB2014/052713
§ 371 (c)(1),
(2) Date: Mar. 11, 2016

(87) PCT Pub. No.: WO2015/040363
PCT Pub. Date: Mar. 26, 2015

(65) Prior Publication Data
US 2016/0221668 A1    Aug. 4, 2016

(30) Foreign Application Priority Data
Sep. 18, 2013 (GB) .................................. 1316605.3

(51) Int. Cl.
*B64C 25/34* (2006.01)
*B64C 25/40* (2006.01)

(52) U.S. Cl.
CPC ............ *B64C 25/405* (2013.01); *B64C 25/34* (2013.01); *Y02T 50/823* (2013.01)

(58) Field of Classification Search
CPC ......... B64C 25/00; B64C 25/02; B64C 25/18; B64C 25/24; B64C 25/34; B64C 25/40;
(Continued)

(56) References Cited

U.S. PATENT DOCUMENTS 3,005,510 A * 10/1961 Phillips ................. B64C 25/405
180/14.7
3,542,318 A * 11/1970 Ellsworth ............... B64C 25/40
244/103 S
(Continued)

FOREIGN PATENT DOCUMENTS

| CN | 1078772 | 11/1993 |
| CN | 1137305 | 12/1996 |

(Continued)

OTHER PUBLICATIONS

Extended European Search Report dated Dec. 8, 2015 in European Application No. 15179966.5.
(Continued)

*Primary Examiner* — Richard R. Green
*Assistant Examiner* — Brady W Frazier
(74) *Attorney, Agent, or Firm* — Nixon & Vanderhye P.C.

(57) ABSTRACT

The invention is a drive system for rotating a wheel of an aircraft landing gear. The drive system includes a motor operable to rotate a drive pinion via a drive path, and a driven gear adapted to be mounted to the wheel. The drive system has a first configuration in which the drive pinion is capable of meshing with the driven gear to permit the motor to drive the driven gear via the drive path. The drive path has an input shaft having an axis of rotation spaced from an axis of rotation of an output shaft. The output shaft is operable to pivot about the axis of rotation of the input shaft. Also, an aircraft landing gear having a wheel and the drive system, where the driven gear of the drive system is mounted to the wheel.

22 Claims, 10 Drawing Sheets

(58) Field of Classification Search
CPC .. B64C 25/405; B64D 2205/00; Y02T 50/823
USPC .................................................... 244/103 S
See application file for complete search history.

(56) References Cited

U.S. PATENT DOCUMENTS

| | | | |
|---|---|---|---|
| 3,762,670 A * | 10/1973 | Chillson | B64C 25/36 180/301 |
| 3,850,389 A | 11/1974 | Dixon | |
| 5,426,476 A * | 6/1995 | Fussell | B64D 47/08 348/E5.026 |
| 5,823,026 A | 10/1998 | Finke | |
| 6,168,113 B1 | 1/2001 | Hann et al. | |
| 2006/0065779 A1 | 3/2006 | McCoskey et al. | |
| 2012/0153075 A1* | 6/2012 | Wilson | B64C 25/405 244/50 |
| 2012/0217340 A1* | 8/2012 | Essinger | B64C 25/405 244/50 |
| 2012/0228921 A1* | 9/2012 | Essinger | B64C 25/405 301/6.2 |
| 2012/0312112 A1* | 12/2012 | Tizac | B64C 25/405 74/354 |
| 2013/0026284 A1* | 1/2013 | Christensen | B64C 25/405 244/50 |
| 2013/0200210 A1 | 8/2013 | Oswald et al. | |
| 2014/0158820 A1 | 6/2014 | Wilson et al. | |
| 2014/0187370 A1 | 7/2014 | Walsh | |
| 2014/0225421 A1* | 8/2014 | Oswald | B64C 25/405 301/6.2 |
| 2014/0245853 A1 | 9/2014 | Didey | |
| 2014/0246539 A1 | 9/2014 | Didey | |
| 2015/0210385 A1 | 7/2015 | Didey | |
| 2016/0221668 A1 | 8/2016 | Didey | |
| 2016/0221669 A1 | 8/2016 | Didey | |
| 2017/0001718 A1 | 1/2017 | Didey | |

FOREIGN PATENT DOCUMENTS

| | | |
|---|---|---|
| CN | 101216056 | 7/2008 |
| CN | 101949398 | 1/2011 |
| EP | 2527249 A1 | 11/2012 |
| EP | 2551192 A2 | 1/2013 |
| EP | 2 860 103 | 4/2015 |
| GB | 1061216 | 3/1967 |
| JP | 54-124893 | 9/1979 |
| JP | 58-142007 | 8/1983 |
| JP | 2-124304 | 10/1990 |
| JP | 5-22807 | 3/1993 |
| JP | 2012224332 | 11/2012 |
| RU | 47280 | 8/2005 |
| RU | 2278304 | 6/2006 |
| WO | 2011023505 A2 | 3/2011 |
| WO | 2011073587 A1 | 6/2011 |
| WO | 2011073590 A1 | 6/2011 |
| WO | 2011134503 A1 | 11/2011 |
| WO | 2012171589 A1 | 12/2012 |
| WO | 2014023939 A1 | 2/2014 |
| WO | 2014023941 A1 | 2/2014 |
| WO | 2015040363 A1 | 3/2015 |
| WO | 2015040370 | 3/2015 |

OTHER PUBLICATIONS

International Search Report and Written Opinion in International Application No. PCT/GB2014/052713 dated Jan. 7, 2015.
Helm, J. et al., "Locking Actuators Today and Beyond" *SAE Technical Paper* 881434 (1988) (16 pages).
Russian Office Action and its English translation for Russian Application No. 2015132882, nine pages, dated Feb. 21, 2019.
English Translation of Chinese First Office Action issued in Chinese Patent Application No. 201510474789.9, 12 pages, dated Oct. 31, 2018.
ISR and WO dated Apr. 2, 2015 issued in PCT/GB2014/052791, 11 pages.
English translation of Notification of Reasons for Refusal for Japanese Application No. 2015-155820, 10 pages, dated Jun. 25, 2019.

* cited by examiner

DRIVE SYSTEM FOR AIRCRAFT LANDING GEAR

RELATED APPLICATIONS

The present application is a National Phase of International Application Number PCT/GB2014/052713, filed Sep. 8, 2014, which claims priority from Great Britain Application Number 1316605.3, filed Sep. 18, 2013.

FIELD OF THE INVENTION

The present invention relates to a drive system for rotating one or more wheels of an aircraft landing gear for the purposes of ground taxiing and/or spin-up prior to landing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

SUMMARY OF THE INVENTION

A first aspect of the invention provides a drive system for rotating a wheel of an aircraft landing gear, the drive system including a motor operable to rotate a drive pinion via a drive path, and a driven gear adapted to be mounted to the wheel, wherein the drive system has a first configuration in which the drive pinion is capable of meshing with the driven gear to permit the motor to drive the driven gear via the drive path, wherein the drive path has an input shaft having an axis of rotation spaced from an axis of rotation of an output shaft, and wherein the output shaft is operable to pivot about the axis of rotation of the input shaft.

The term "wheel" of the aircraft landing gear is used here in its conventional sense to refer to a ground wheel which contacts the ground surface when the aircraft is supported by the ground and is not airborne. The term "motor" is used here in its conventional sense to refer to a machine whereby some source of energy (e.g. electric, pneumatic, hydraulic, etc.) is used to give motion. It is to be understood that the motor may be a motor-generator, which, in addition to its function as a motor, is operable as a generator whereby mechanical energy is converted into electrical energy. The terms "drive" and "driven" are used here with reference to the "drive pinion" and the "driven gear" refer to convey the sense of power transfer when the motor is operable to rotate the wheel of the aircraft landing gear. It will, of course, be appreciated that where the motor is a motor-generator and is acting as a generator the "driven gear" will in fact be the driving element which drives the "drive pinion" and therefore the generator. The generator may be used to apply a braking torque to the wheel.

The input shaft may be coaxial with an axis of rotation of the motor (i.e. the rotor axis), or alternatively the input shaft and the motor may be rotatable about spaced axes and coupled via a torque transmission arrangement.

The drive path may include one or more of: a belt, a chain, a cable or a gear wheel. The drive path may include a combination of torque transmission arrangements, e.g. a meshing gear stage and a belt drive stage.

The input shaft and the output shaft may be rotatable about parallel axes. Alternatively the axes may be skewed.

The drive path may be a single stage torque transmission arrangement, or may be a multi-stage torque transmission arrangement, e.g. comprising two stages.

Each stage may comprise a reduction gear arrangement. The reduction gear arrangement may include meshing spur gears, or other type of toothed gears.

Each stage of a multi-stage torque transmission arrangement may be mounted on parallel axes.

The drive path may be mounted within a housing having a pivot with a pivot axis coaxial with the axis of rotation of the input shaft for pivotally mounting the housing to the aircraft landing gear.

The drive system may further comprise an actuator (or positioner) for coupling between the housing and the aircraft landing gear so that extension and retraction of the actuator causes rotation of the housing about the pivot.

The drive system may be switchable between the first configuration and a second configuration in which the drive pinion is not capable of meshing with the driven gear.

The drive pinion may be mounted on the output shaft, or alternatively the output shaft and the drive pinion may be rotatable about spaced axes and coupled via a torque transmission arrangement.

The drive pinion may be moveable between a first position and a second position as the output shaft pivots about the axis of rotation of the input shaft, the first position corresponding to the first configuration and the second position corresponding to the second configuration.

The drive pinion may be a first drive pinion and the drive path a first drive path, and the drive system may further comprise a second drive pinion, the motor being operable to rotate the second drive pinion via a second drive path, wherein the drive system is switchable between the first configuration and a third configuration in which the second drive pinion is capable of meshing with the driven gear to permit the motor to drive the driven gear via the second drive path, wherein the first drive path has a different gearing ratio than the second drive path.

A further aspect of the invention provides an aircraft landing gear having a wheel and a drive system according to the first aspect, wherein the driven gear of the drive system is mounted to the wheel.

The axis of rotation of the input shaft may be fixed with respect to the landing gear wheel axis of rotation.

The driven gear may be mounted to a rim of the wheel, e.g. by fixing directly or via a flexible interface.

The wheel may be driveable for taxiing the aircraft on the ground and/or spinning-up the wheel prior to landing.

BRIEF DESCRIPTION OF THE DRAWINGS

Embodiments of the invention will now be described with reference to the accompanying drawings, in which.

DETAILED DESCRIPTION OF EMBODIMENT(S)

A first embodiment of the invention is shown in FIGS. 1 to 6. In the illustrated embodiment the landing gear has two wheels, but the principles of the embodiment may be applied to landing gear with any number of wheels including only a single wheel. The embodiment shows a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft).

Figure 1:
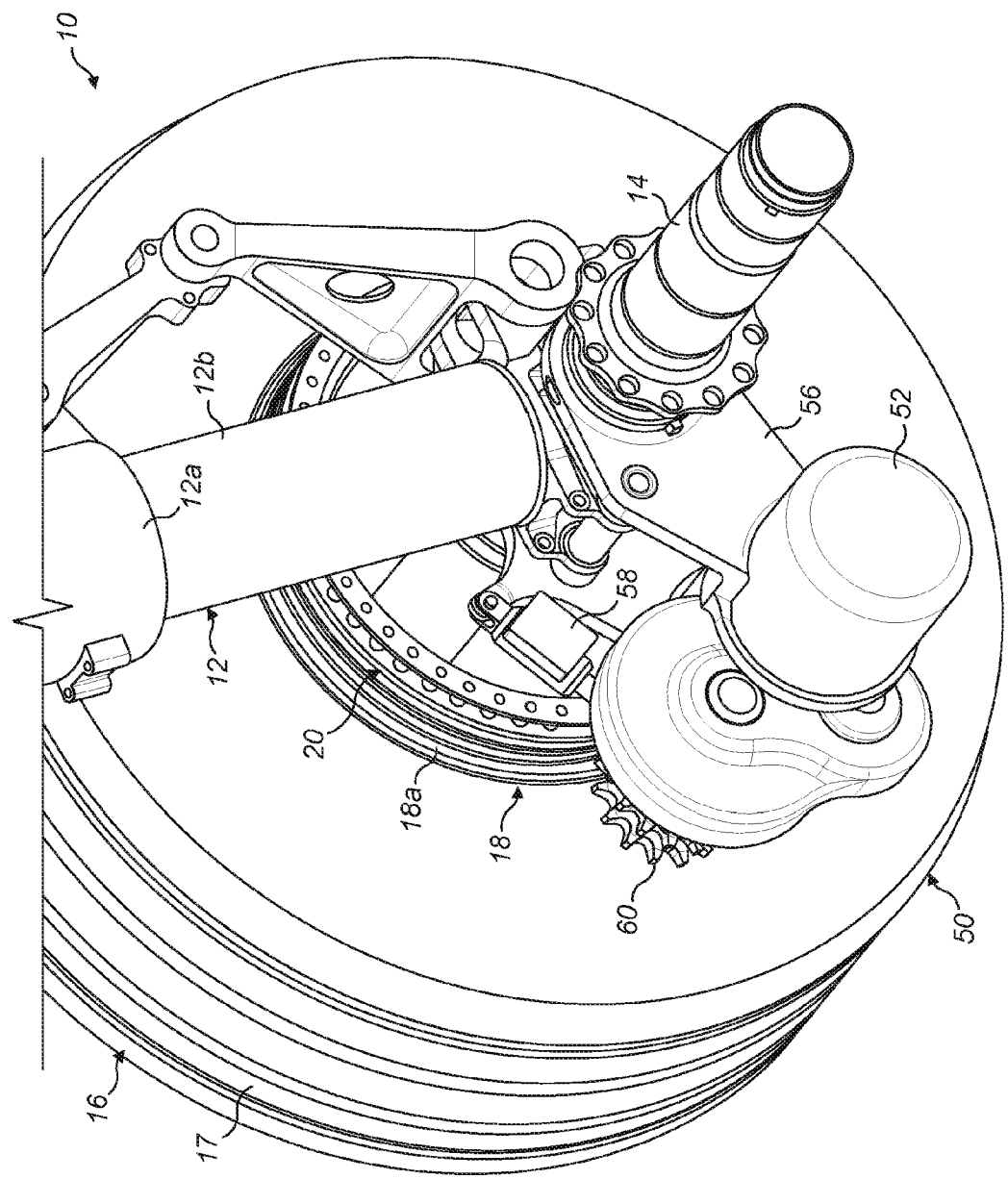
FIG. 1 shows an isometric view of a drive system according to a first embodiment.
Figure 2:
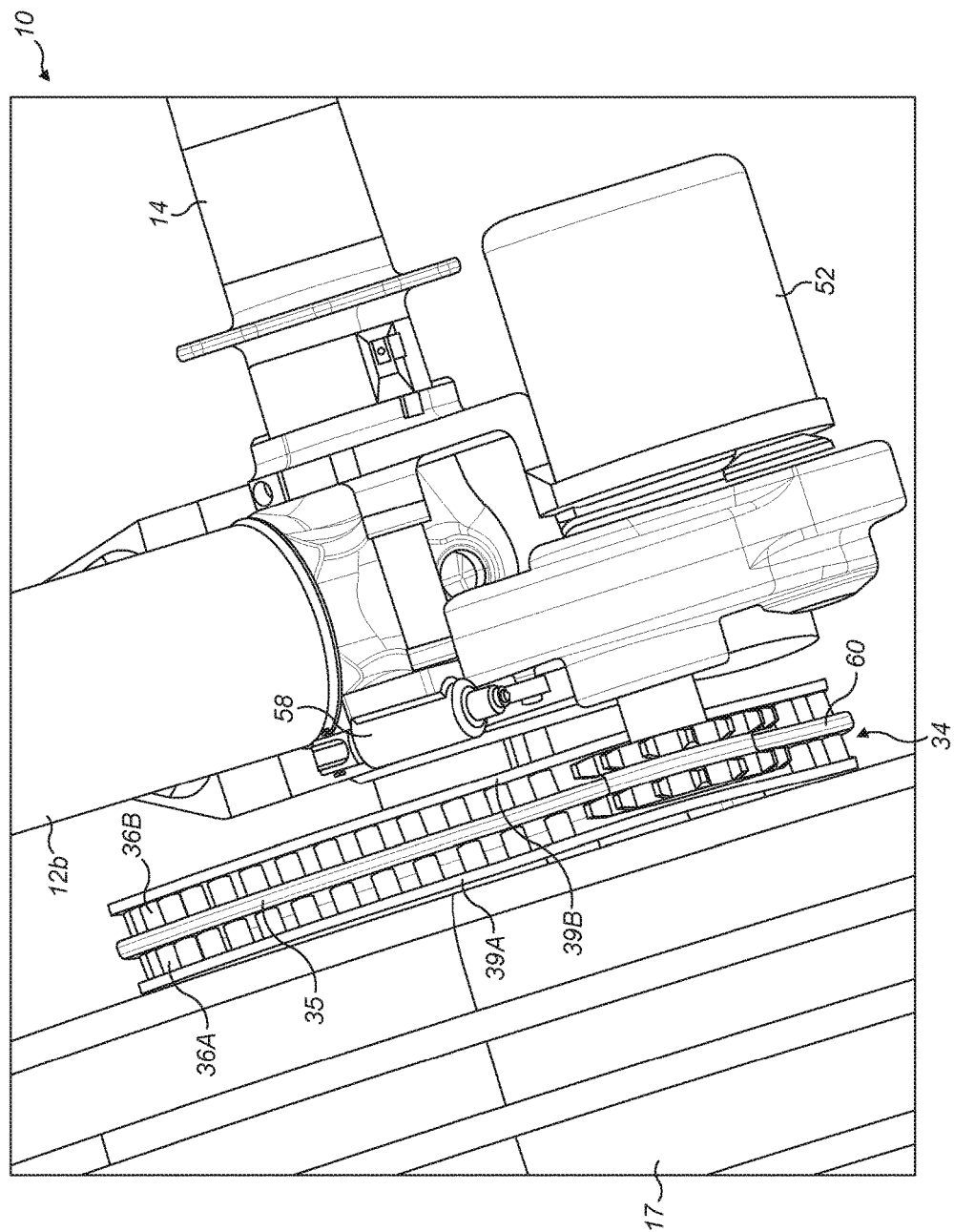
FIG. 2 shows a further isometric view of the drive system of FIG. 1.
Figure 3:
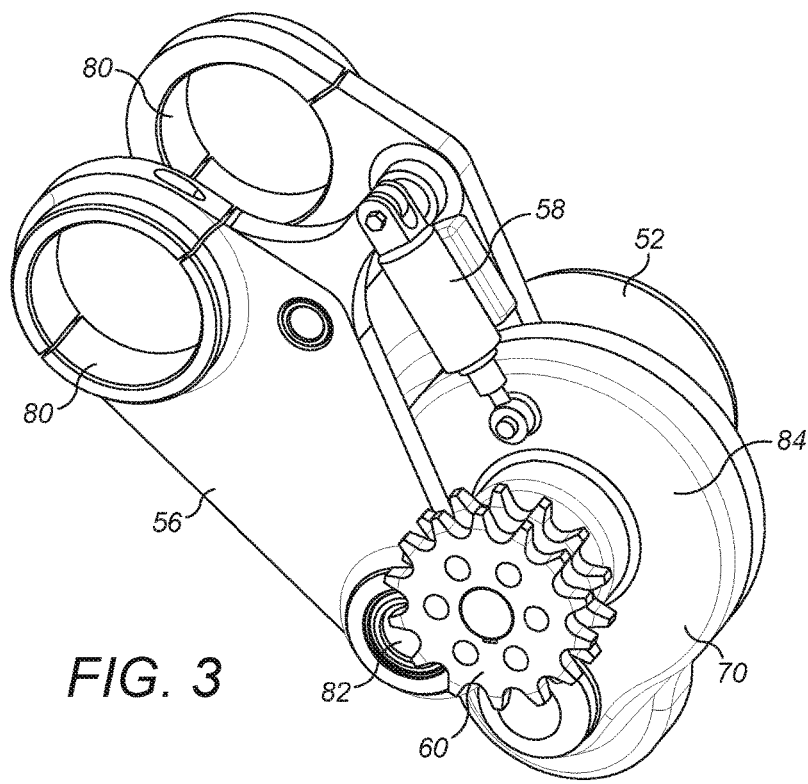
FIG. 3 shows an isometric view of selected components of the drive system of FIG. 1, with the actuator retracted.
Figure 4:
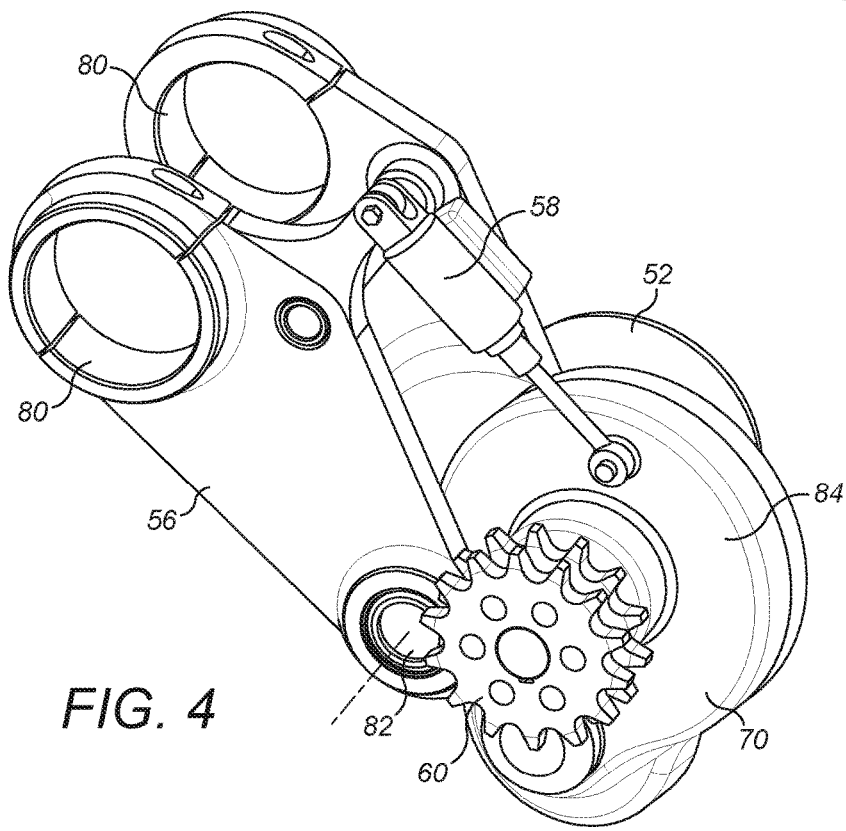
FIG. 4 shows another isometric view similar to FIG. 3 but with the actuator extended.
Figure 5:
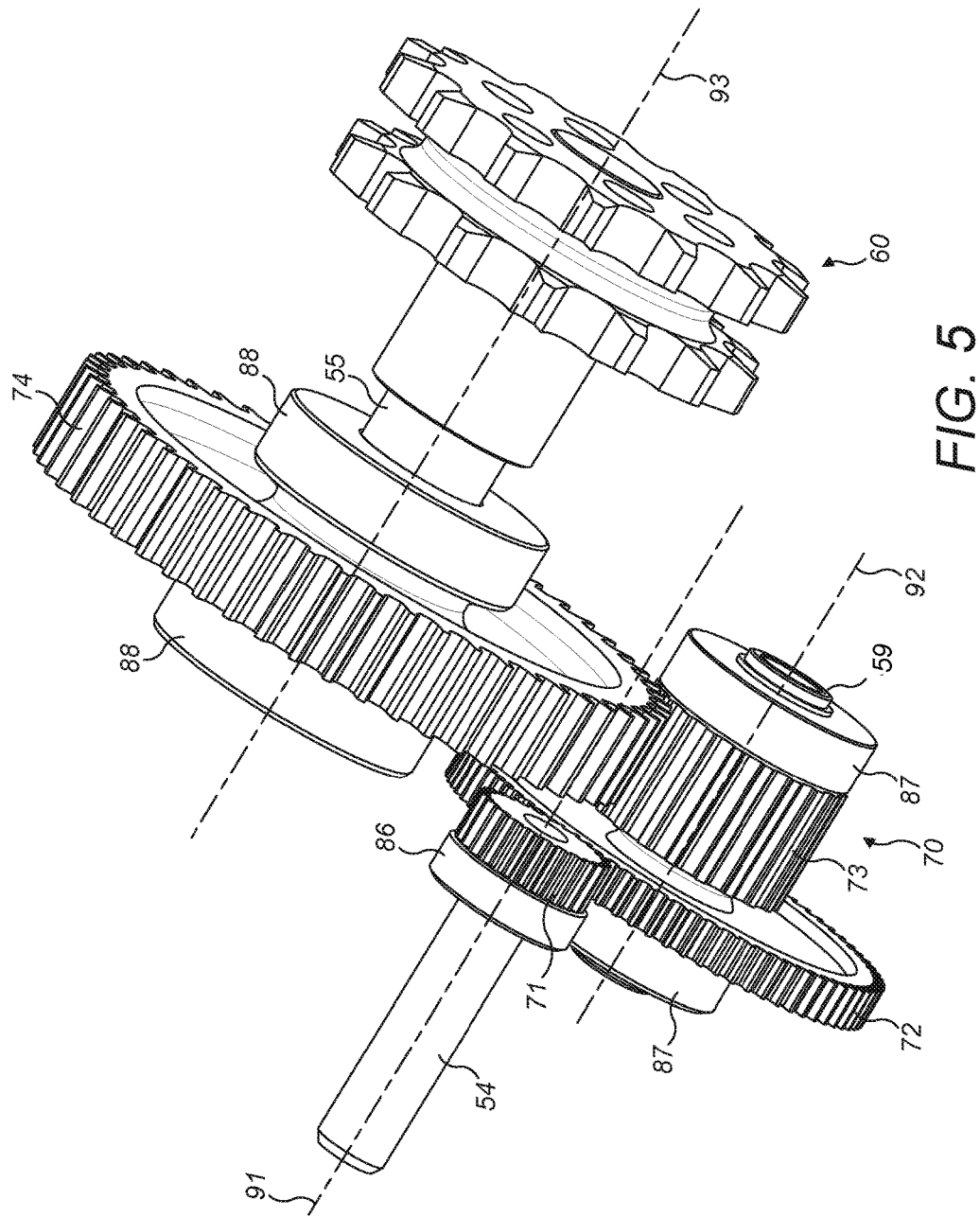
FIG. 5 shows an isometric view of the gears of the gearbox of the drive system of FIG. 1.
Figure 6:
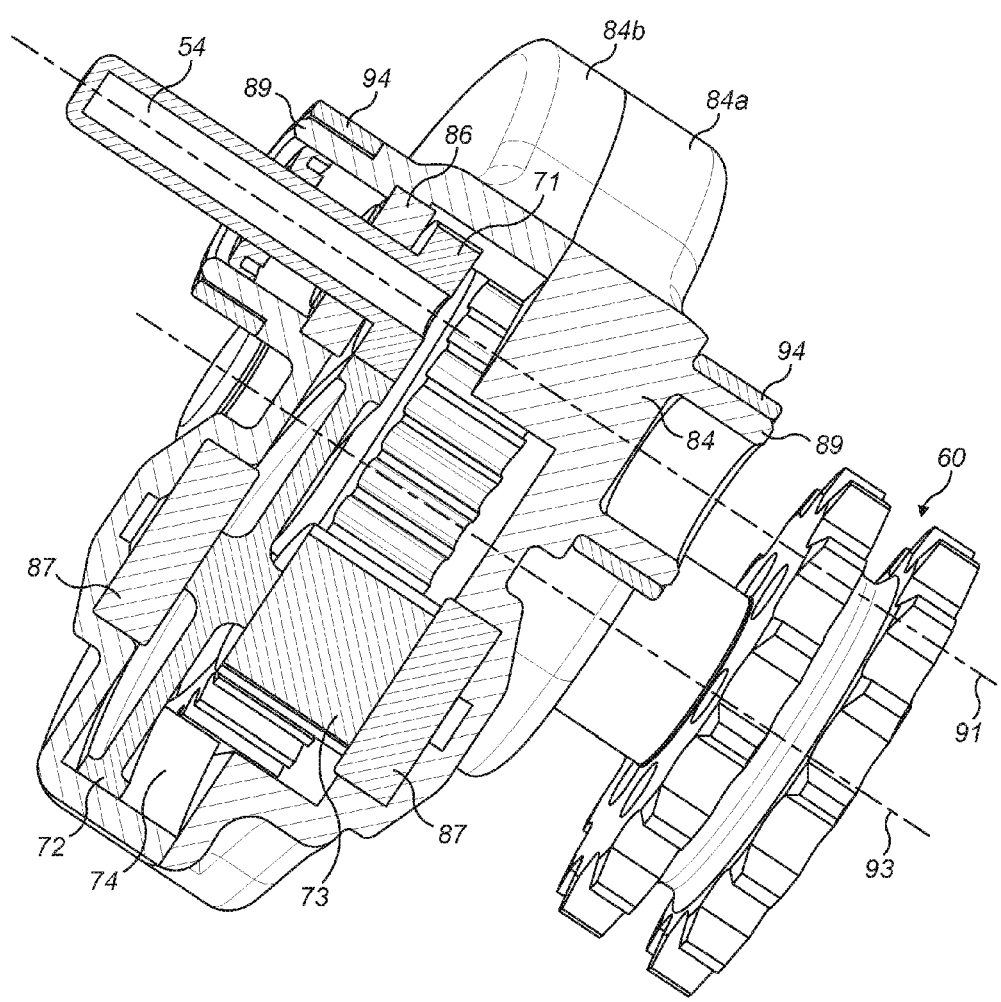
FIG. 6 shows an isometric section through the gearbox of the drive system of FIG. 1.

The landing gear 10 includes a telescopic shock absorbing main leg 12, including an upper telescopic part 12a (main fitting) and a lower telescopic part 12b (the slider). The upper telescopic part 12a is attached to the aircraft fuselage or wing (not shown) by its upper end (not shown). The lower telescopic part 12b supports an axel 14 carrying a pair of wheels 16, one on either side of the main leg (only one wheel 16 is shown in FIGS. 1 and 2, for clarity). The wheels 16 are arranged to rotate about the axel 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16, the driven gear 20 comprising a roller gear 34 formed by a rigid annular ring 35 and a series of pins (not labelled) projecting from both sides of the annular ring 35. A first series of rollers 36a rotatably supported by the pins (not labelled) is provided on one side of the annular ring 35, and a second series of rollers 36b rotatably supported by the pins as provided on the other side of the annular ring. Each series of rollers 36a, 36b extend around the annular ring to form a continuous track. First and second lateral annular rings 39a, 39b sandwich the first and second series of rollers 36a, 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins which are cantilevered off the central spine. The annular ring 35 comprises a plurality of axially extending connection extension tabs (not shown) providing mounting means for mounting the roller gear 34 to the hub 18. Alternatively, the tabs may be substituted for a flange forming a continuous extension rim projecting axially from the annular ring 35.

A drive system 50 comprises a motor 52 which rotates output sprockets 60 via a gearbox 70. The sprockets 60 are wheel type sprockets with radially extending teeth which can interlock with the rollers 36 of roller gear 34. The drive system 50 is supported by a bracket 56 which is rigidly connected to the axle 14 of the landing gear. The bracket 56 includes two lugs comprising half moon clamps to permit ready attachment and detachment of the bracket 56 to the axel 14. The motor 52 is fixedly connected, e.g. by bolting, to the bracket 56. The gearbox 70 is pivotally connected to the bracket 56 at pivot lugs 82 on each arm of the bracket 56 disposed either side of the gearbox 70.

The gearbox 70 comprises a two stage parallel axis reduction gear transmission. The transmission comprises first 71, second 72, third 73 and fourth 74 cooperating spur gears. The first gear 71 is fixed to the input shaft 54 so that it rotates with that shaft about a first axis 91. The first gear 71 is in permanent meshing engagement with the second gear 72 rotatable about a second axis 92 spaced from and parallel to the first axis 91. The third gear 73 is mounted coaxially with the second gear 72 for rotation about the second axis 92. The third gear 73 is in permanent meshing engagement with the fourth gear 74 fixed to an output shaft 55 so that it rotates with that shaft. The output shaft 55 is rotatable about a third axis 93 spaced from and parallel with the first and second axis 91, 92. The sprockets 60 are fixed to the output shaft 55 so that they rotate with that shaft. The first, second, third and fourth gears 71 to 74 provide the drive path between the input shaft 54 and the sprockets 60. The first and second gears 71, 72 provide a first reduction gear arrangement of the drive path and the third and fourth gears 73, 74 provide a second stage reduction gear arrangement of the drive path.

The two stage parallel axis gearbox 70 is encased within a housing 84 formed in two parts joints 84a, 84b joined together. Input shaft 54 is mounted for rotation with respect the housing 84 by bush 86. Intermediate shaft 59 having the second and third gears 72, 73 fixed thereto is mounted for rotation with respect to the housing 84 by bushes 87, and output shaft 55 is mounted for rotation with respect to the housing 84 by bushes 88.

Projecting outwardly from either side of the housing 84 are bosses 89 having bushes 94 which fit within the pivot lugs 82 of the bracket 56 for rotation of the housing 84 with respect to the bracket 56. The axis of rotation of the pivotal connection between the housing 84 and the bracket 56 is coaxial with the axis of rotation of the input shaft 54. The input shaft 54 is the output shaft of the motor 52 or alternatively may be directly coupled to the output shaft of the motor 52. In this way, it becomes possible to fix the motor 52 to the bracket 56 whilst permitting the gearbox 70 to rotate with respect to the bracket 56.

A linear actuator 58, such as a direct drive roller screw electro mechanical linear actuator, extends between the bracket 56 (at an end nearest the axel 15) and the gearbox 70, or more particularly the housing 84 of the gearbox. Thus, linear movement of the actuator 58 is translated into rotational movement of the gearbox 70 and the sprockets 60 about the pivot 82. The drive system 50 can therefore be rotated between a first position corresponding to a first configuration in which the sprockets 60 engage the roller gear 34 and a second position corresponding to a second configuration in which the sprockets 60 are disengaged from the roller gear.

Fixing the motor 52 to the bracket 56 and using the linear actuator 58 to pivot the gearbox 70 with respect to the bracket advantageously reduces the loads on the actuator (positioner) as compared with a drive system where the motor is fixed with respect to the gearbox so as to move with the gearbox between the engaged and disengaged positions. Also, when in the disengaged position the loads acting on a stop (not shown) limiting the travel of the gearbox are reduced as compared with the loads on a stop limiting the travel of a gearbox and motor. Furthermore, the loads on a biasing element such as a spring for biasing the gearbox into the disengaged position will be lower than for a similar biasing element for biasing a gearbox and motor into the disengaged position. Therefore the invention advantageously reduces the mass of the drive system that requires rotation between the engaged and disengaged positions, and provides additional freedom in configuring the actuator (e.g. the position of the bearings and axis of rotation) making it easier to optimise bearing loads, actuator loads and driven gear loads.

Whilst in the illustrated first embodiment the motor is fixed to the bracket, the motor can alternatively be mounted to rotate relative to the bracket so as to rotate with the gearbox 70 about the pivotal connection between the gearbox housing 84 and the bracket 56 (i.e. about the first axis 91). In this case the loads on the actuator (positioner) will still be reduced as compared with the drive system of the first embodiment since the motor axis of rotation is coaxial with the pivotal connection between the housing 84 and the bracket 56. This loads reduction is optimised if the motor is substantially rotationally symmetric.

The first embodiment is suitable only for ground taxiing operations but could be modified (e.g. by adjustment of the gearbox ratio) to be suitable for only pre-landing spin-up operations. In the taxiing configuration the linear actuator 58 (which may be back drivable) may be torque controlled (or current controlled) to apply a substantially constant load between the sprockets 60 and the driven gear 20, thereby allowing for some deformation of the various component parts of the drive system 50 while at the same time preventing unwanted separation. An electro mechanical brake (not shown), or other similar blocking device, may be integrated within the actuator 58 to lock the actuator in the disengaged (second) configuration.

Figure 7:
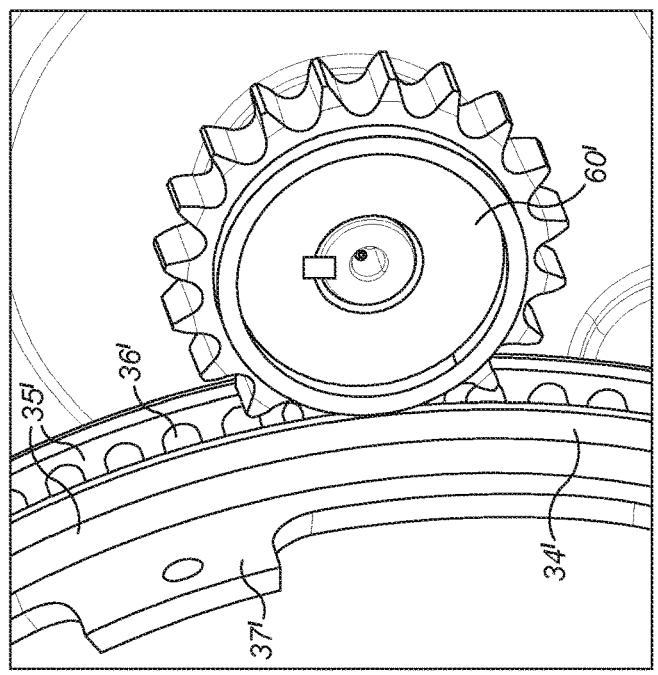
FIG. 7 shows an isometric view of selected components of the drive system of FIG. 1 with an alternative drive pinion and driven gear.

The driven gear 20 formed as a roller gear 34 having two co-axial rings of rollers and the pinion having two sprockets 60 for engaging the respective rings of rollers may be replaced with a roller gear 34' having a single ring of rollers and a pinion having a single sprocket 60', as shown in FIG. 7. The roller gear 34' is formed by two rigid annular rings 35' connected together by a series of rollers 36' extending around the rings to form a continuous track. The rollers 36' are each rotatable about a pin (not shown) which extends between the annular rings 35' to form a rigid connection between the annular rings 35'. One of the annular rings 35' comprises a plurality of connection extension tabs 37' which provide a rigid connection to the hub 18.

Figure 8:
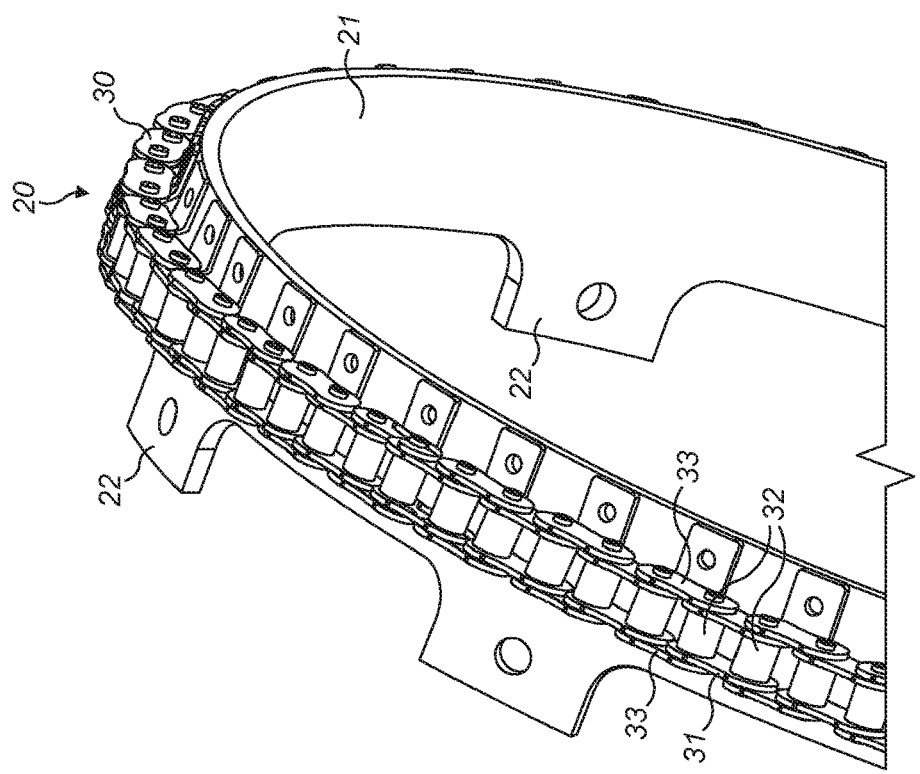
FIG. 8 shows an isometric view of an alternative driven gear of the drive system of FIG. 7.

FIG. 8 illustrates an alternative arrangement for the driven gear 20 in which a roller chain 30 extends around a rigid annular extension ring 21. The roller chain 30 is driven by a single sprocket (not shown) similar to the sprocket 60'. The extension ring 21 (or drum) is rigidly attached to the hub 18 via a plurality of extension tabs 22 so that it extends from an outer circumference of the hub 18 towards the leg 12. A roller chain 30 is fixed around the outer circumference of the extension ring 21 so that it forms a continuous track around the ring 21. The roller chain 30 comprises multiple interlinked chain elements 31, each comprising a sub-assembly of two rollers 32 mounted on parallel axes. Each roller 32 is rotatable about a bush (not shown) which is itself mounted on a pin (not shown). Each chain element 31 is pivotally mounted to its neighbouring element by a pair of link elements 33 so that the rollers 32 are arranged to form a continuous track, or series, and each element 31 is thus designed to be able to rotate relative to its neighbour. Of course, since the roller chain 30 is fixed to the extension ring 21, the chain elements 31 are prevented from pivoting relative to one another. The driven gear may includes a plurality of multiple coaxial chains engagable by a pinion formed by multiple coaxial sprockets.

Figure 9:
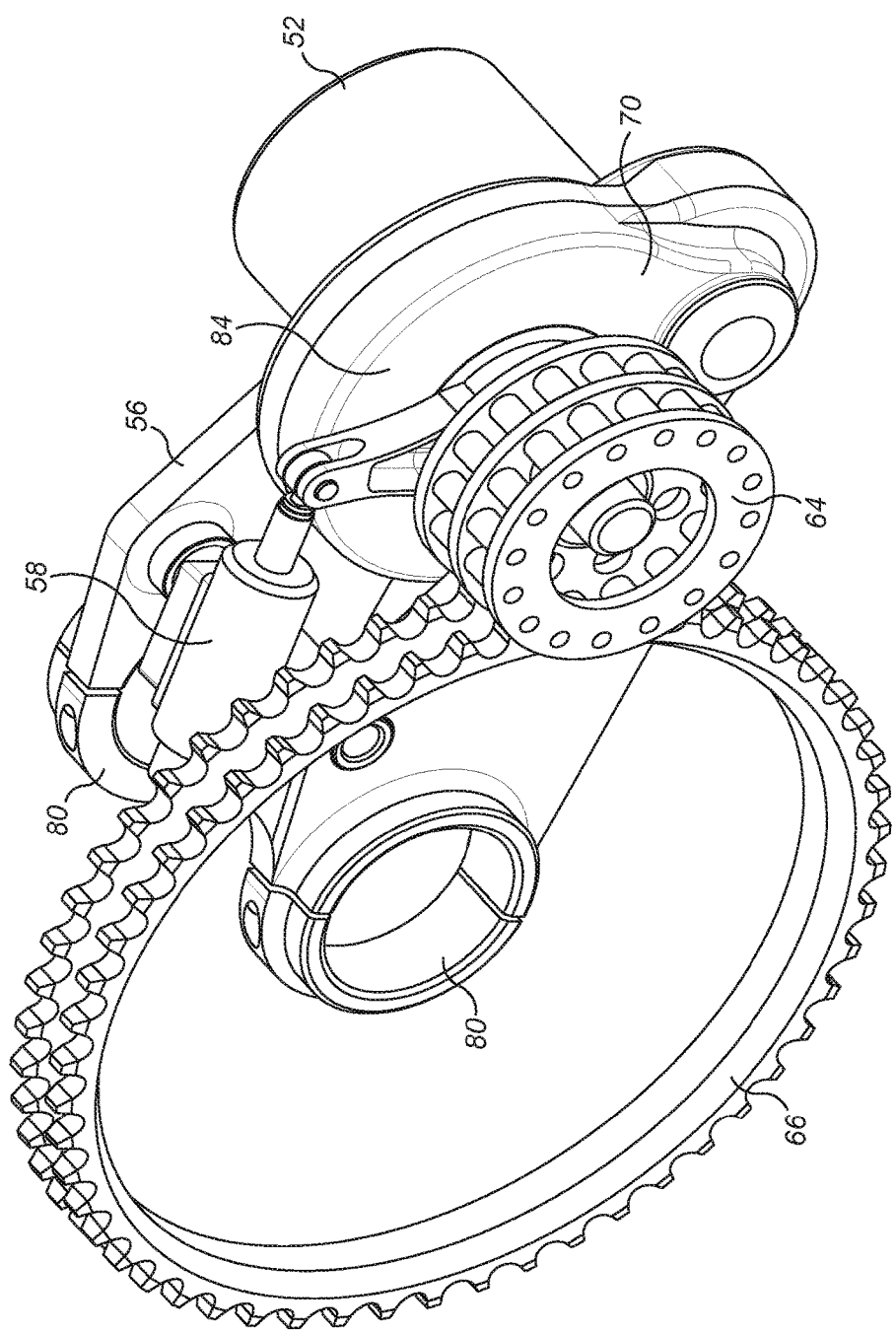
FIG. 9 shows an isometric view of selected components of a drive system according to a second embodiment.
Figure 11:
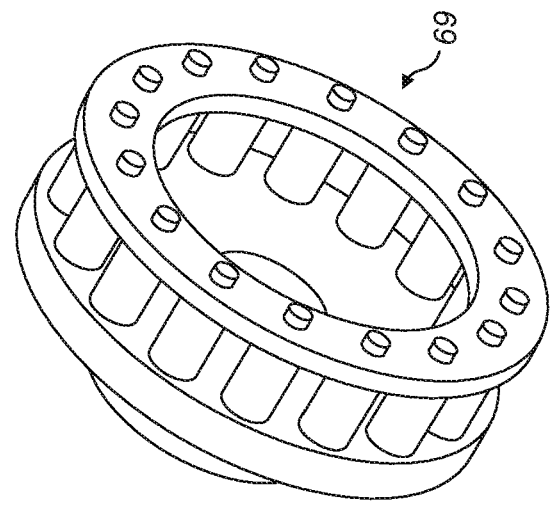
FIGS. 10 and 11 show isometric views of alternative drive pinions.
Figure 10:
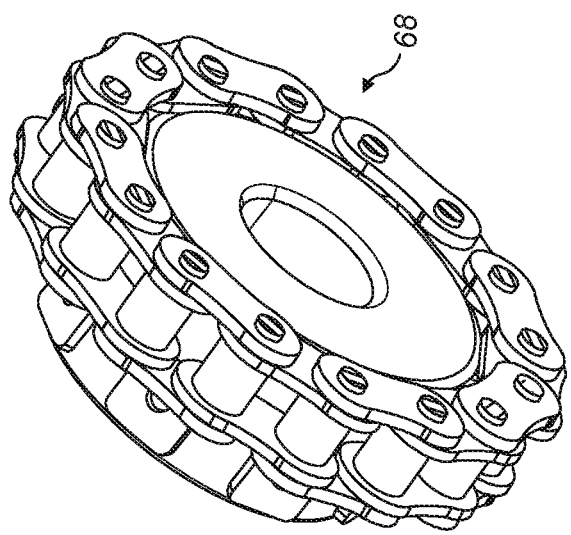

FIG. 9 shows a second embodiment in which the sprocket 60 (drive pinion) are replaced by a roller gear 64 having two co-axial rings of rollers and the roller gear 34 (driven gear) is replaced by sprocket 66 having two coaxial rings of sprocket teeth. In all other respect the drive system is identical to that described above with reference to FIGS. 1 to 8. The roller gear 64 may be constructed similarly to the roller gear 34, although of course it has a much smaller diameter and therefore fewer rollers. The drive pinion may alternatively be formed as a roller chain 68 or roller gear 69 having a single ring of rollers, as illustrated in FIGS. 10 and 11, respectively, for engaging with a driven gear formed as a sprocket (not shown) having a single row of sprocket teeth.

In each of the arrangements described above the principle of achieving drive via meshing between a sprocket and roller gear/roller chain can be applied when the driven gear comprises the sprocket and the drive pinion comprises the roller gear/roller chain, and vice versa. Alternatively the driven pinion may be formed as a spur gear or other type of toothed gear, and the driven gear may be formed as a ring gear or other type of toothed gear (not shown).

Figure 12A:
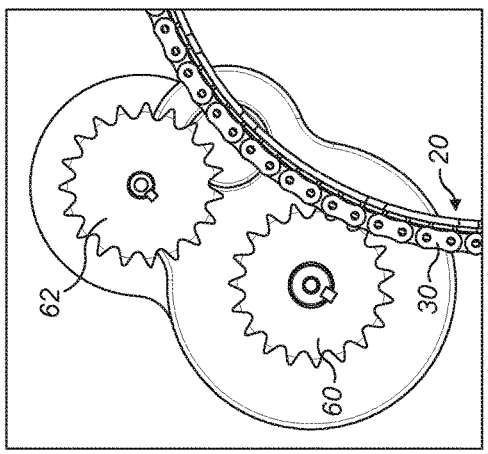
FIGS. 12 A-C show side views of selected components of a drive system according to a third embodiment with two output pinions, the drive system shown in a ground taxi configuration (A), neutral configuration (C), and spin-up configuration (B)
Figure 12B:
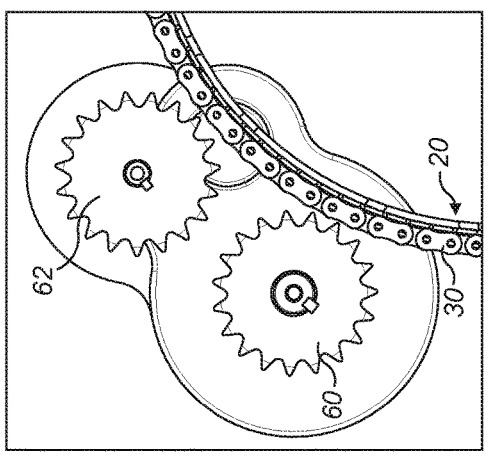
Figure 12C:
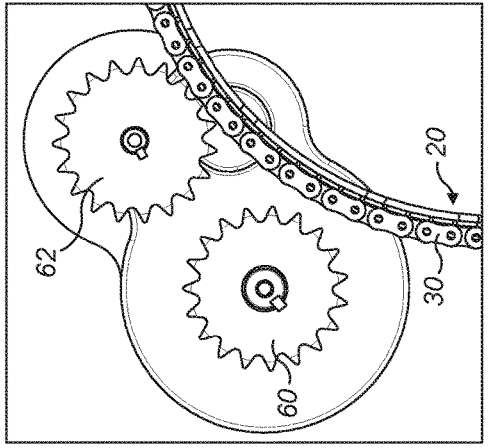
Figure 13:
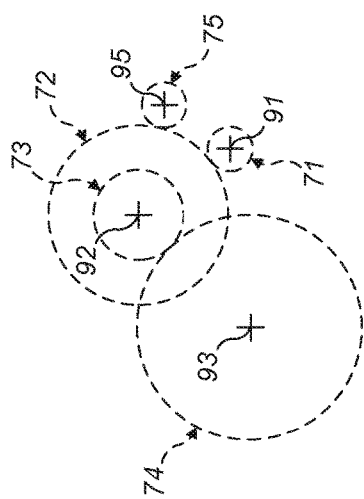
FIG. 13 shows a schematic of the drive paths of the gearbox of the drive system of FIGS. 12 A-C.

In a third embodiment illustrated in FIGS. 12A-C the drive system differs from the drive system of the first embodiment only in that it includes two drive paths for driving respective output shafts, each output shaft having a respective drive pinion. In the illustrated embodiment the drive pinions are first 60 and second 62 sprockets each formed as wheel-type sprockets with radially-extending teeth which can interlock with the rollers 32 of the roller chain 30 (or rollers 36 of roller gear 34). Each of the two drive paths between the input shaft and the first 60 and second 62 sprockets respectively is a two stage gear arrangement similar to the that of the first and second embodiments described above. The gearing ratio of the second drive path for driving the second sprocket 62 is much lower than that of the first drive path for driving the first sprocket 60. A schematic of the gear arrangement of the two drive paths is shown in FIG. 13, which differs from the gear arrangement of the first embodiment shown in FIG. 5 only in that it further comprises a fifth gear 75 mounted on the second output shaft (having the second sprocket 62) rotatable about a fourth axis 95.

As with the first and second embodiments, in the third embodiment the output shafts (having the output pinions mounted thereon) of the drive system are operable to pivot about the axis of rotation of the input shaft. The input shaft is coaxial with the axis of rotation of the motor (not shown in FIGS. 12A-C). The input and output shafts are rotatable about parallel axes and the gearbox includes a gear arrangement comprising meshing spur gears. The drive paths are mounted within a housing having a pivot with a pivot axis coaxial with the axis of rotation of the input shaft for pivotally mounting the housing to the aircraft gear via bracket 56. Because of the location of the pivot axis between the axes of rotation of the sprockets 60, 62, the drive system 50 can be rotated between a position in which only the first sprocket 60 engages the roller chain 30 (FIG. 12A) and a position in which only the second sprocket 62 engages the roller chain 30 (FIG. 12C). In a position between these two extremes neither sprocket 60, 62 engages the roller chain 30 (FIG. 12B). This pivoting arrangement ensures that it is not possible for both the first sprocket 60 and second sprocket 62 to engage the roller chain 30 at the same time.

Thus, the drive system of the third embodiment is arranged to have three configurations: a low speed, high torque taxiing configuration in which the motor 52 drives the wheel 16 via the first drive path and first sprocket 60 (FIG. 12A); a high speed, low torque spin-up configuration in which the motor 52 drives the wheel 16 via the second drive path and second sprocket 62 (FIG. 12C); and a neutral (disconnected) configuration in which neither the first sprocket 60 nor the second sprocket 62 engages the roller chain (FIG. 12B). The taxiing configuration is suitable for accelerating the wheel 16 to speeds of 175 rpm (equivalent to 20 knots) during ground taxing, while the spin-up configuration is suitable for accelerating the wheel 16 to rotational speeds of 1400 rpm (equivalent to 160 knots ground speed) prior to touch down on landing.

In the taxing configuration the linear actuator 58 (which may be back-drivable) may be torque controlled (or current controlled) to apply a substantially constant load between the first sprocket 60 and the driven gear 20, thereby allowing for some deformation of the various component parts of the drive system 50 while at the same time preventing unwanted separation. The linear actuator 58 may be similarly controlled in the spin-up configuration, although separation loads will be lower during spin-up than during ground taxiing so this should be reflected in the control logic. In the neutral configuration the linear actuator 58 may be position controlled to achieve the neutral position whereby neither sprocket is engaged with the driven gear 20. An electromechanical brake (not shown), or other similar locking device, may be integrated within the actuator 58 to lock the actuator in the neutral configuration.

Figure 16:
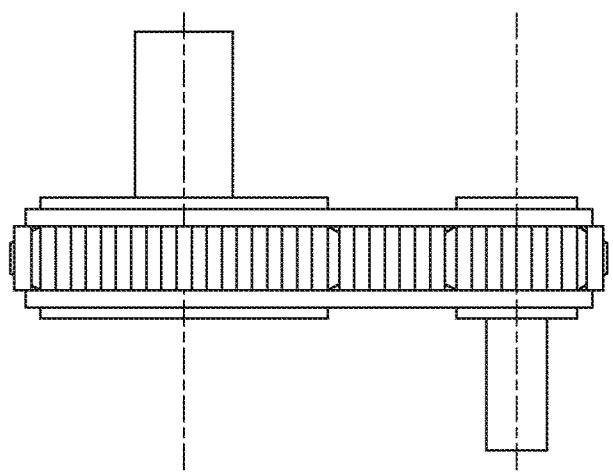
FIGS. 14-16 show alternative torque transmission arrangements for the gearbox having a single stage drive path, the arrangements shown as meshing gears (FIG. 14), a belt or cable drive (FIG. 15) and a chain drive (FIG. 16).
Figure 15:
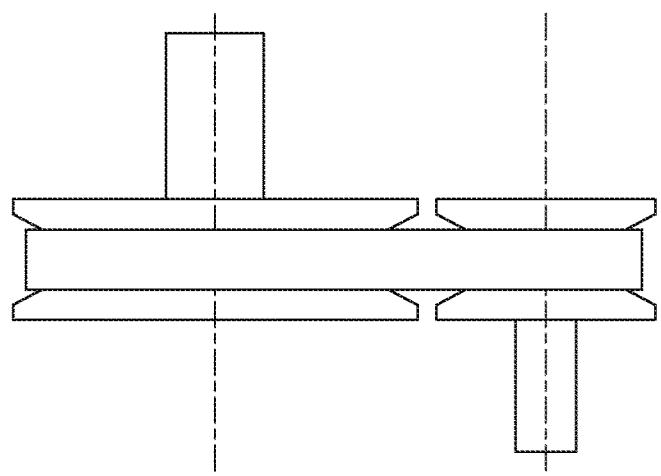
Figure 14:
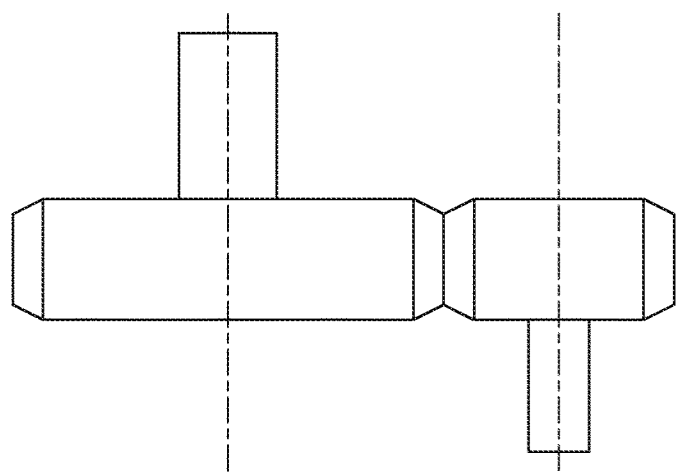

Whilst in the embodiments described above the drive path(s) between the input shaft and the output shaft of the gearbox comprises a two stage parallel axis gear arrangement it will be appreciate that other torque transmission arrangements may be used instead. For example, the number of stages may be any number including only a single stage, and the torque transmission may be via a belt/cable or chain instead of gears. FIG. 14 illustrates a single stage reduction toothed gear arrangement. FIG. 15 illustrates a single stage reduction belt/cable drive arrangement. FIG. 16 illustrates a single stage reduction chain drive arrangement. These may be adopted in any of the embodiments described above. It will be appreciated that in any single or multiple stage drive path the output shaft is arranged to pivot about the axis of rotation of the input shaft. Also, the stage(s) of the drive path need not be mounted on parallel axes and skew axis torque transmission arrangements may be used instead.

Although the figures only show features of the drive system 50 for driving one of the wheels 16, it is intended that these features be mirrored for the other wheel 16. That is, it is intended that one drive system 50 will be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft 54 of each drive system.

Although the figures only show the drive system 50 supported by a bracket 56 which is rigidly connected to the axle 14 of the landing gear, the drive system 50 may alternatively be mounted on the upper telescopic part 12*a* (main fitting) or lower telescopic part 12*b* (slider).

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including a motor operable to rotate a drive pinion via a drive path, and a driven gear adapted to be mounted to the wheel, wherein the drive system has a first configuration in which the drive pinion is capable of meshing with the driven gear to permit the motor to drive the driven gear via the drive path, wherein the drive path has an input shaft having an axis of rotation spaced from an axis of rotation of an output shaft, and wherein the output shaft is operable to pivot about the axis of rotation of the input shaft, wherein the drive path is mounted within a housing having a pivot with a pivot axis coaxial with the axis of rotation of the input shaft for pivotally mounting the housing to the aircraft landing gear.

2. A drive system according to claim 1, wherein the input shaft is coaxial with an axis of rotation of the motor.

3. A drive system according to claim 1, wherein the drive path includes one or more of: a belt, a chain, a cable or a gear wheel.

4. A drive system according to claim 1, wherein the input shaft and the output shaft are rotatable about parallel axes.

5. A drive system according to claim 1, wherein the drive path is a single stage torque transmission arrangement.

6. A drive system according to claim 1, wherein the drive path is a multi-stage torque transmission arrangement.

7. A drive system according to claim 5, wherein the stage comprises a reduction gear arrangement.

8. A drive system according to claim 7, wherein the reduction gear arrangement includes meshing spur gears.

9. A drive system according to claim 6, wherein each stage is mounted on parallel axes.

10. A drive system according to claim 6, wherein the drive path comprises a two stage torque transmission arrangement having a first stage and a second stage.

11. A drive system according to claim 1, wherein the drive system is switchable between the first configuration and a second configuration in which the drive pinion is not capable of meshing with the driven gear.

12. A drive system according to claim 1, wherein the drive pinion is mounted on the output shaft.

13. A drive system according to claim 11, wherein the drive pinion is moveable between a first position and a second position as the output shaft pivots about the axis of rotation of the input shaft, the first position corresponding to the first configuration and the second position corresponding to the second configuration.

14. A drive system according to claim 1, wherein the drive pinion is a first drive pinion and the drive path is a first drive path, and the drive system further comprises a second drive pinion, the motor being operable to rotate the second drive pinion via a second drive path, wherein the drive system is switchable between the first configuration and a third configuration in which the second drive pinion is capable of meshing with the driven gear to permit the motor to drive the driven gear via the second drive path, wherein the first drive path has a different gearing ratio than the second drive path.

15. An aircraft landing gear having a wheel and a drive system according to claim 1, wherein the driven gear of the drive system is mounted to the wheel.

16. An aircraft landing gear according to claim 15, wherein the axis of rotation of the input shaft is fixed with respect to the landing gear wheel axis of rotation.

17. An aircraft landing gear according to claim 15, wherein the driven gear is mounted to a hub rim of the wheel.

18. An aircraft landing gear according to claim 15, wherein the wheel is driveable for taxiing the aircraft on the ground and/or spinning-up the wheel prior to landing.

19. A drive system according to claim 1, wherein the drive system is supported by a bracket which is rigidly connected to the axle, main fitting or slider part of the landing gear.

20. A drive system according to claim 19, wherein the bracket includes two lugs comprising half-moon clamps to permit ready attachment and detachment of the bracket.

21. A drive system according to claim 6, wherein each stage comprises a reduction gear arrangement.

22. A drive system according to claim 21, wherein the reduction gear arrangement includes meshing spur gears.

* * * * *